Patented Jan. 19, 1954

2,666,697

UNITED STATES PATENT OFFICE 2,666,697

FERROUS ALLOYS

Mathias L. Eder, Canton, Ohio; Louise J. Eder, executrix of said Mathias L. Eder, deceased, assignor to Louise J. Eder, Canton, Ohio No Drawing. Application January 18, 1951, Serial No. 206,733

6 Claims. (Cl. 75—128)

The invention relates generally to ferrous alloys, with particular reference to an alloy which is especially adapted for use in the forming of weld rods for hard facing purposes, and the ferrous alloy to which the invention pertains is principally intended for use as a weld rod overlay for hot shear blades, hot trimming dies, vertical edging rolls, and tools for making seamless tubing, and other related applications where there is need for a wear-resistant metal operating at high temperatures. The ferrous alloy referred to may also be used for casting machine parts for similar applications.

Ferrous alloys for hard facing of equipment subjected to impact or abrasions, or both, are well known in the industry. However a completely satisfactory ferrous alloy for hard facing of equipment subject to abrasion or impact at high temperatures, has not been produced prior to the present invention.

It has been found that the addition of tungsten to such ferrous alloys has very beneficial effects as it resists tempering action, or softening, upon repeated heatings while in service and that it reduces the coefficient of friction, which contributes to wear resistance, a very important feature; and produces the formation of carbides, which are undoubtedly the hardest of any of the carbides, and are resistant to decomposing at high temperatures, and wear-resistant at the high temperatures encountered in the above-mentioned applications.

The addition of vanadium also has very beneficial effects upon such an alloy, as it functions to increase grain refinement, acts as a stabilizing element at elevated temperatures, and prevents separation or breakdown of the complex carbides, and besides controlling the grain size also influences the forming of finer carbides.

It is therefore an object of the present invention to provide a ferrous alloy of the type referred to, containing small amounts of chromium, nickel and molybdenum and also containing a substantial amount of tungsten.

Another object is to provide such a ferrous alloy which may contain a relatively small amount of vanadium.

A further object is to provide a relatively low cost ferrous alloy, especially adapted for hard facing, which has a high resistance to wear, abrasion and impact or high temperatures.

A still further object is to provide such a ferrous alloy especially adapted for weld rods for hard facing, or for casting purposes.

The above objects together with others which will be apparent from the following description or which may be later referred to, may be attained by carrying out the invention in the manner hereinafter described in detail.

The improved hard facing, or casting, ferrous alloy, to which the invention pertains, contains about .50 to 2.0% chromium; 1.0 to 2.0% nickel; 2.5 to 4.0% molybdenum; 2.5 to 6.0% tungsten and .50 to 1.0% carbon, and preferably contains a small amount of vanadium, which when present may be up to 1.5% and may be as low as .25%.

Such a ferrous alloy is principally intended for use as a weld rod overlay for hot shear blades, hot trimming dies, vertical edging rolls, and tools for making seamless tubing, and other similar applications where there is need for a wear-resistant metal operating at high temperatures.

As above mentioned, this ferrous alloy is also adapted for use for casting various machine parts which may be subjected to wear or abrasion under high temperature conditions. This ferrous alloy is especially useful because of the fact that it has resistance to wear, abrasion and/or impact at high temperatures, and resistance to oxidation, and high mechanical strength at high temperatures.

It has been found by actual practice that the addition of tungsten, in quantities of 2.5% up to 6%, has many very beneficial effects on a ferrous alloy intended for the above uses. Some of the characteristics of such a ferrous alloy are:

High tempering properties, in that the alloy resists tempering action or softening upon repeated heating, reduction of the coefficient of friction, which contributes to wear resistance and is a very important property; the formation of carbides which are undoubtedly the hardest of any of the carbides, and their resistance to decompose at high temperatures encountered in the above mentioned applications.

Although molybdenum is possibly more effective in producing high temperature properties, it does not produce as hard a carbide as tungsten and therefore does not give the wear resistance that is required in metal used for hot shear blades and similar applications, where severe wear or abrasion under high temperature is equally as important as resistance to deformation.

Service tests have shown that this alloy has a much greater extended life over competitive alloys not containing tungsten, for use in applications where the parts are subjected to severe wear and abrasion at high temperatures. The increased life of this ferrous alloy has been as great as two and one-half times that of competitive alloys not containing tungsten.

The addition of vanadium to the ferrous alloy also has several important functions, namely it produces grain refinement, acts as a stabilizing element at elevated temperatures, and prevents separation or breakdown of the complex carbides, and furthermore, besides controlling the grain size the vanadium also influences the forming of finer carbides.

The physical properties imparted by the vanadium addition are resistance to impact, and high tensile strength. The vanadium also prevents softening while the metal is subjected to high temperatures in service.

It has been found by actual test that the addition of vanadium is very beneficial to such an alloy intended to withstand the service required at high temperatures, such as large vertical rolls, where the hot metal is in contact with the ferrous alloy hard facing upon the rolls.

The surface of a roll, faced with this ferrous alloy, is subjected to severe high temperatures by the hot bars passing over the face of the roll, and cold water is used to cool the rolls and causes a quenching action on the hard facing ferrous alloy.

The vanadium addition to the ferrous alloy prevents severe cracking of the deposit due to the quenching action of the water on the rolls when in use, and the same is true in the case of large knives for shearing hot steel, where water is applied to the shear blades to cool them.

As the knives cut through large hot bars, the edge of the knife blade becomes sufficiently hot to show color, and when the cut is completed the water directed onto the blade quenches the hot edge of the blade and frequently causes severe cracking.

By adding vanadium to the ferrous alloy, excessive cracking, due to the quenching encountered in these operations, is greatly reduced. The vanadium also increases the high temperature properties and the tensile strength, which is very important on such high temperature applications as above referred to.

Actual tests made on this ferrous alloy, in the above described applications, shows the absence of severe cross-checking. The service life of the parts, hard faced with this ferrous alloy, is increased considerably over competitive alloys, which show severe cracking when subjected to repeated heating and quenching action in such hot applications.

An example of an alloy made in accordance with the invention, which actual service tests have proven to have given as great as two and one-half times the life of competitive alloys without tungsten or vanadium additions, is of the following analysis:

| Chromium, percent | Nickel, percent | Molybdenum, percent | Tungsten, percent | Vanadium, percent | Carbon, percent |
|---|---|---|---|---|---|
| 2.0 | 2.0 | 4.0 | 3.0 | .75 | .80 |

I claim:

1. A ferrous alloy particularly adapted for hard facing purposes to resist wear and abrasion at high temperatures, said alloy containing about .8% carbon, about 2.0% chromium, about 2.0% nickel, not more than 4.0% molybdenum, about 3.0% tungsten, about .75% vanadium, and the remainder of said alloy being iron.

2. A weld rod for hard facing purposes, said rod comprising a ferrous alloy containing about .80% carbon, about 2.0% chromium, about 2.0% nickel, not over 4.0% molybdenum, about 3.0% tungsten, and vanadium in effective amounts up to about 1.5%, the remainder of said alloy being iron.

3. A weld rod for hard facing purposes, said rod comprising a ferrous alloy containing about .8% carbon, about 2.0% chromium, about 2.0% nickel, not more than 4.0% molybdenum, about 3.0% tungsten, about .75% vanadium, and the remainder of said alloy being iron.

4. An article adapted for cutting or forming operations, said article having a facing thereon comprising a ferrous alloy containing about .8% carbon, about 2.0% chromium, about 2.0% nickel, not more than 4.0% molybdenum, about 3.0% tungsten, about .75% vanadium, and the remainder of said alloy being iron.

5. A ferrous alloy particularly adapted for hard facing purposes to resist wear and abrasion at high temperatures, said alloy containing about .80% carbon, about 2.0% chromium, about 2.0% nickel, not over 4.0% molybdenum, about 3.0% tungsten, and vanadium in effective amounts up to about 1.5%, the remainder of said alloy being iron.

6. An article adapted for cutting or forming operations, said article having a facing thereon comprising a ferrous alloy containing about .80% carbon, about 2.0% chromium, about 2.0% nickel, not over 4.0% molybdenum, about 3.0% tungsten, and vanadium in effective amounts up to about 1.5%, the remainder of said alloy being iron.

MATHIAS L. EDER.

References Cited in the file of this patent

UNITED STATES PATENTS

| Number | Name | Date |
|---|---|---|
| 2,145,756 | Ervin | Jan. 31, 1939 |
| 2,147,123 | Emmons | Feb. 14, 1939 |

FOREIGN PATENTS

| Number | Country | Date |
|---|---|---|
| 15,976 | Great Britain | of 1907 |